No. 747,280. PATENTED DEC. 15, 1903.
C. VANDERBILT.
TENDER FOR LOCOMOTIVES OR THE LIKE.
APPLICATION FILED OCT. 30, 1902.
NO MODEL. 7 SHEETS—SHEET 1.

WITNESSES:
C. W. Benjamin
Chas. G. Hensley

INVENTOR
Cornelius Vanderbilt.
BY
Joseph L. Levy
ATTORNEY

No. 747,280. PATENTED DEC. 15, 1903.
C. VANDERBILT.
TENDER FOR LOCOMOTIVES OR THE LIKE.
APPLICATION FILED OCT. 30, 1902.
NO MODEL. 7 SHEETS—SHEET 5.

WITNESSES:
INVENTOR
Cornelius Vanderbilt
BY
ATTORNEY

No. 747,280. PATENTED DEC. 15, 1903.
C. VANDERBILT.
TENDER FOR LOCOMOTIVES OR THE LIKE.
APPLICATION FILED OCT. 30, 1902.
NO MODEL. 7 SHEETS—SHEET 6.

WITNESSES:
C. W. Benjamin
Chas. G. Hensley

INVENTOR
Cornelius Vanderbilt.
BY Joseph L. Levy
ATTORNEY

No. 747,280. PATENTED DEC. 15, 1903.
C. VANDERBILT.
TENDER FOR LOCOMOTIVES OR THE LIKE.
APPLICATION FILED OCT. 30, 1902.
NO MODEL. 7 SHEETS—SHEET 7.

WITNESSES:

INVENTOR
Cornelius Vanderbilt
BY
ATTORNEY

No. 747,280. Patented December 15, 1903.

UNITED STATES PATENT OFFICE.

CORNELIUS VANDERBILT, OF NEW YORK, N. Y.

TENDER FOR LOCOMOTIVES OR THE LIKE.

SPECIFICATION forming part of Letters Patent No. 747,280, dated December 15, 1903.

Application filed October 30, 1902. Serial No. 129,406. (No model.)

*To all whom it may concern:*

Be it known that I, CORNELIUS VANDERBILT, a citizen of the United States, residing in the city of New York, borough of Manhattan, and county and State of New York, have invented certain new and useful Improvements in Tenders for Locomotives or the Like, of which the following is a specification.

My invention relates to improvements in the construction of tenders for locomotives, although in certain aspects the hereinafter-described improvements may be otherwise employed; and it has for its object to produce a tender (or structure for kindred purposes) embodying certain improvements of the tender shown and described in the patent granted to me on September 3, 1901, bearing No. 681,760. For the most part these improvements reside in the frame, the means for attaching the body to the frame, and in the structure which supports the frame on the axles, which dispenses with the employment of a pair of pivotal trucks, reduces the wheelbase, and enables three pairs of wheels to carry the tender, thereby forming a lighter, cheaper, and more rigid construction. I obtain these several results by means of the construction hereinafter described, and which constitutes a preferred form or embodiment of my invention, and finally pointed out in the claims.

Figure 1:
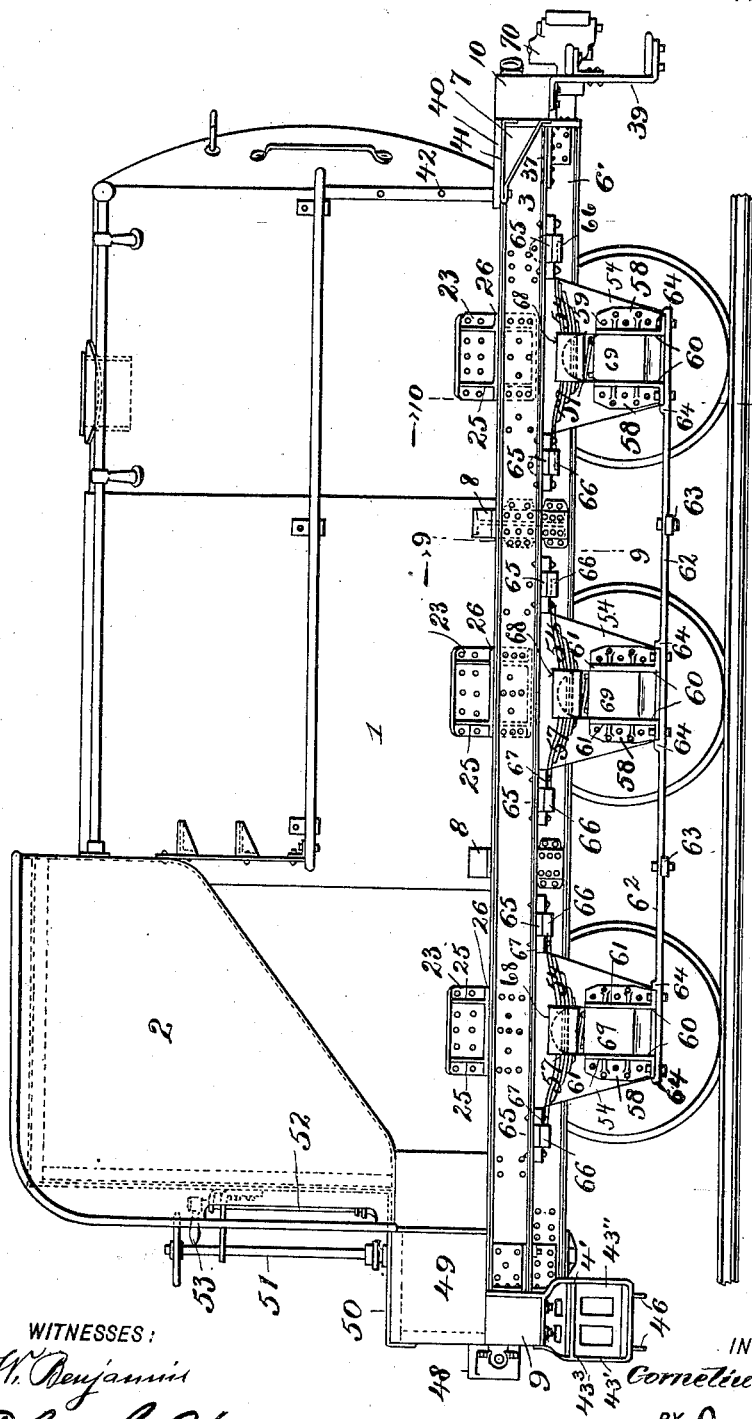
Figure 2:
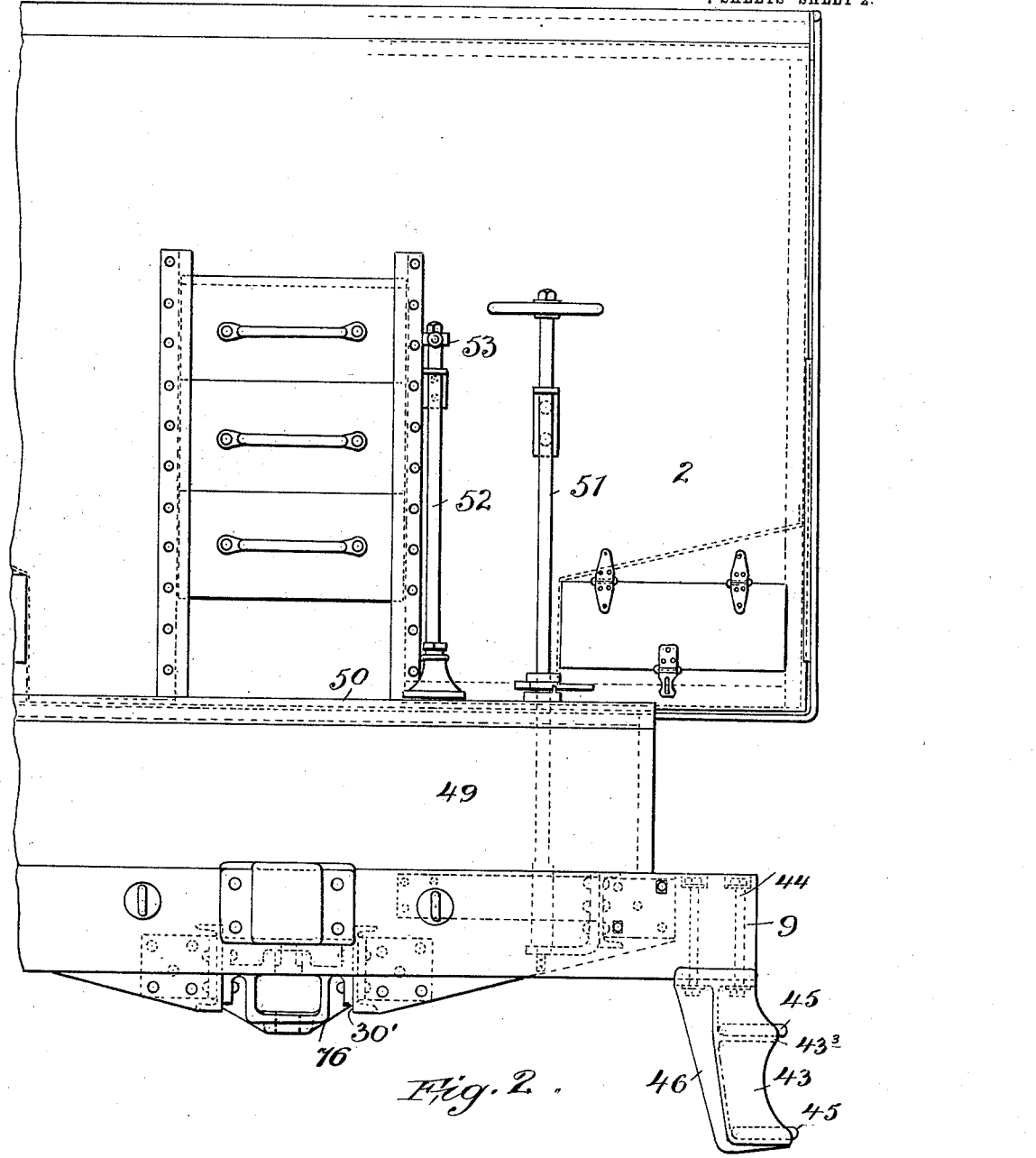
Figure 3:
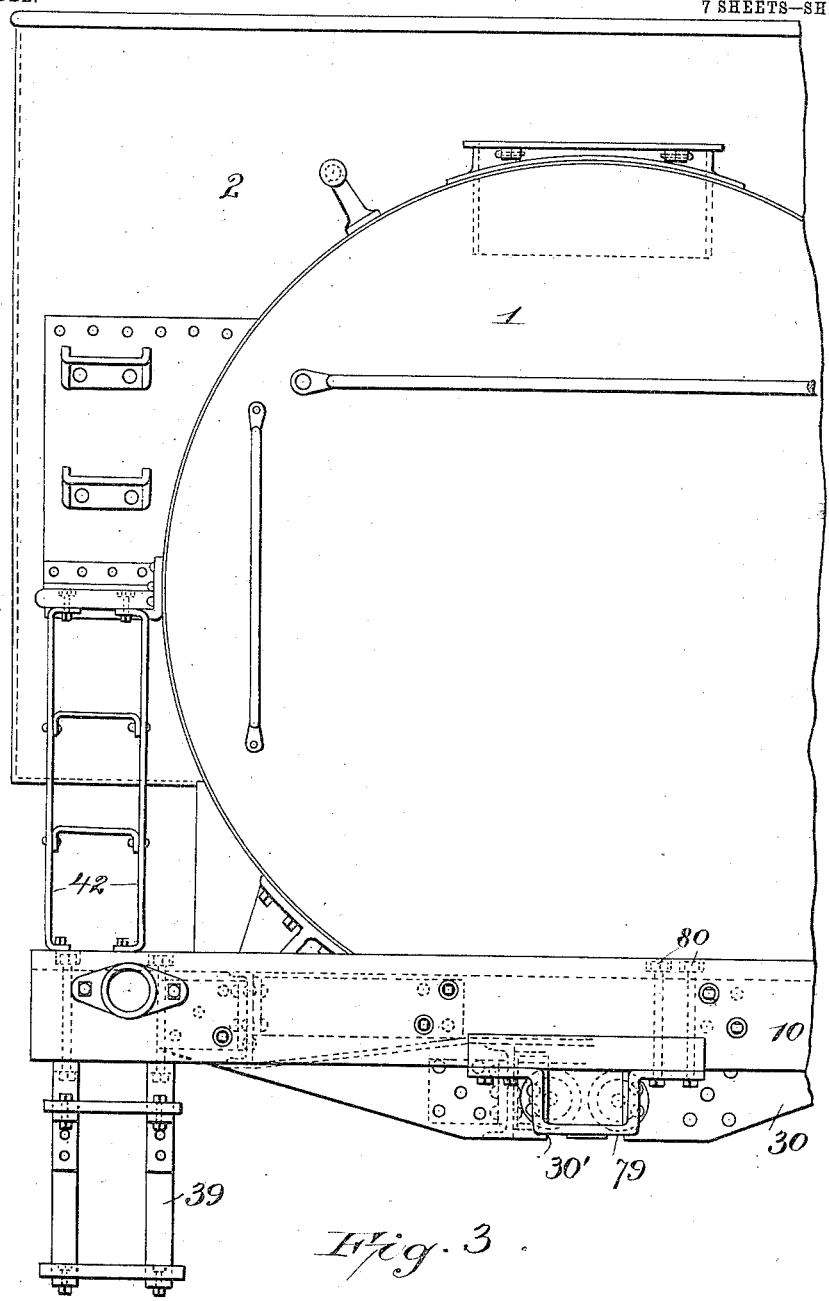
Figure 4:
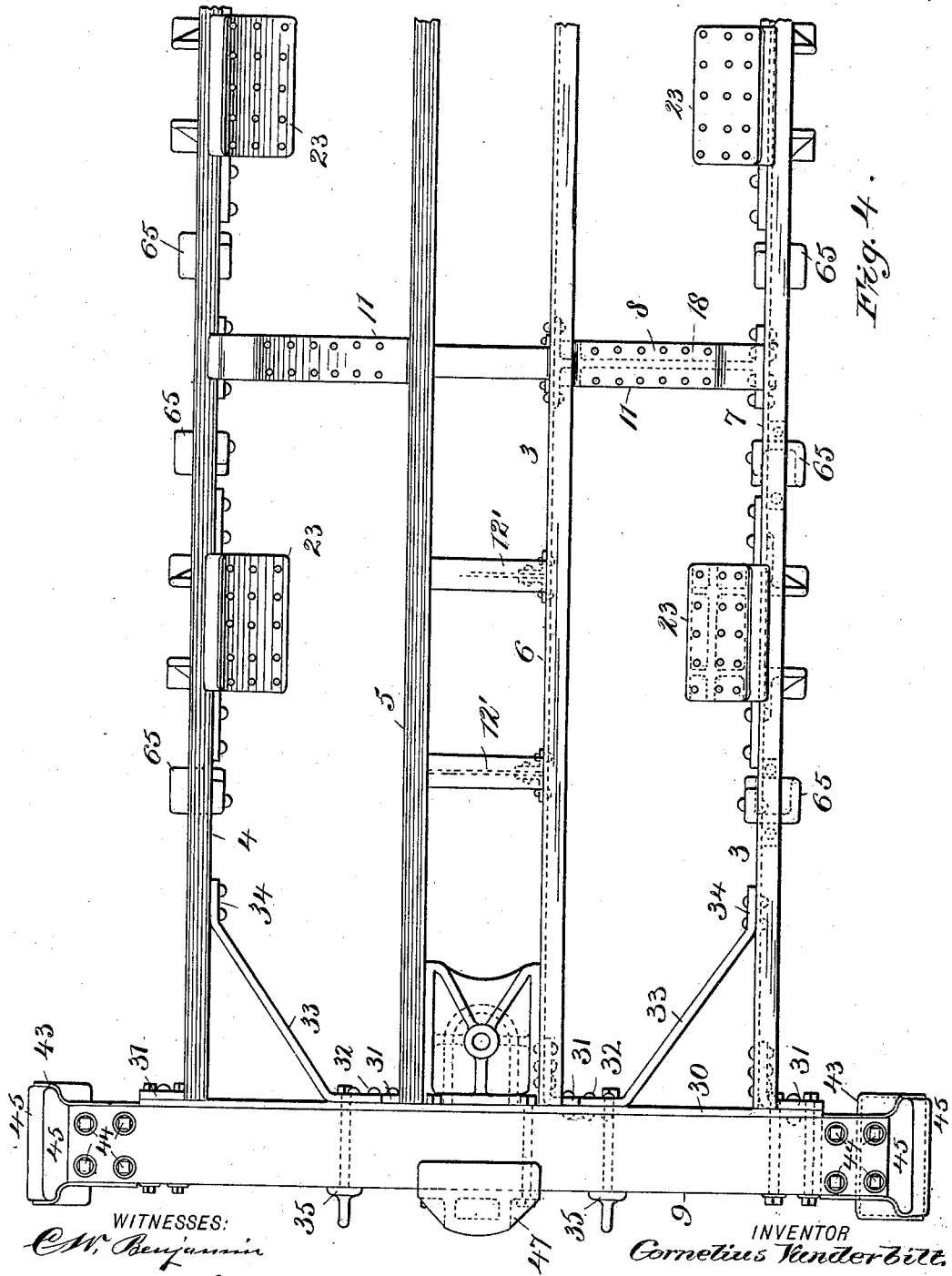
Figure 5:
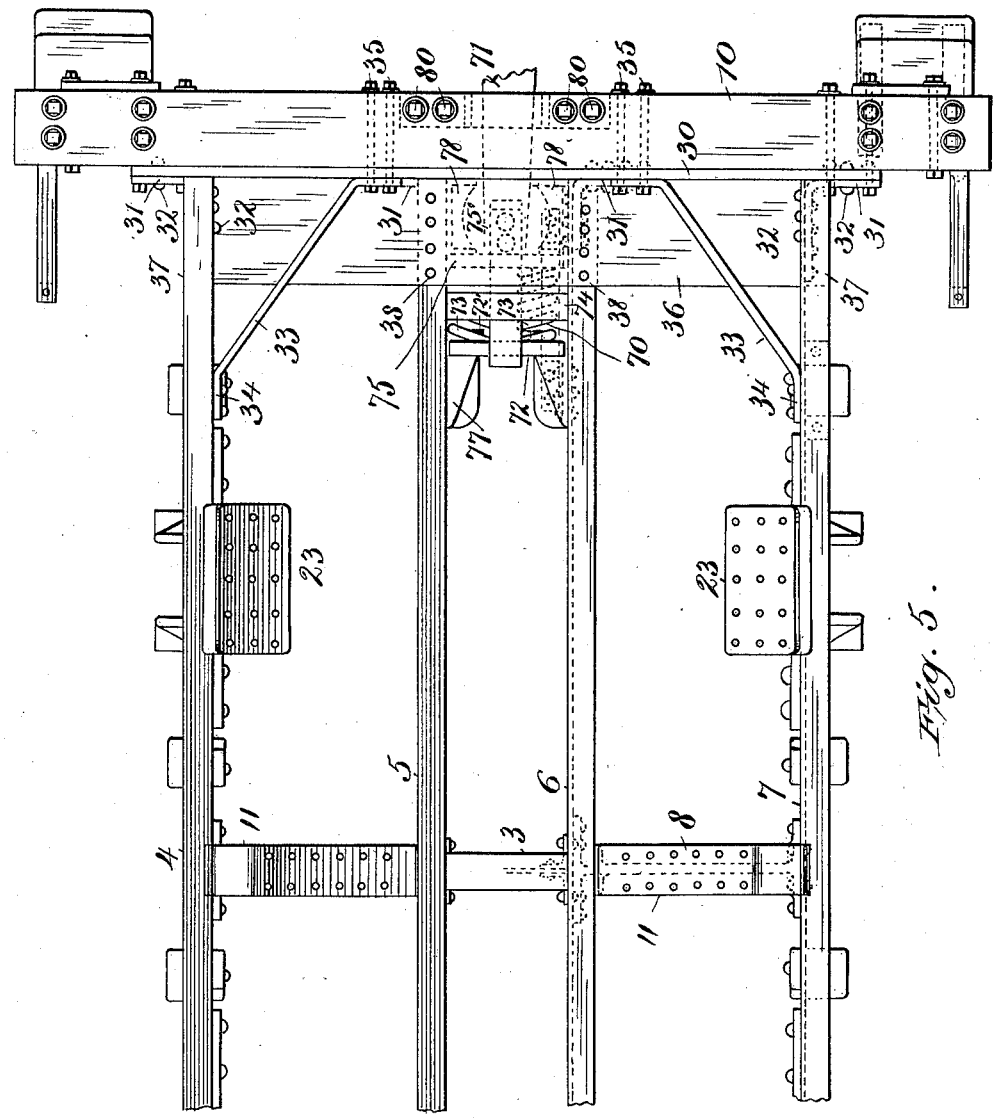
Figure 6:
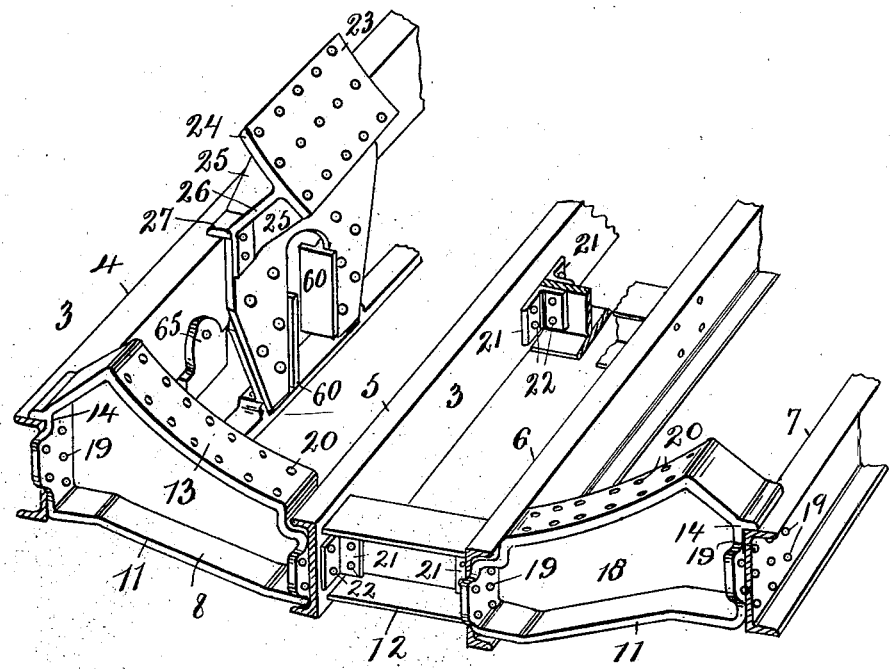
Figure 7:
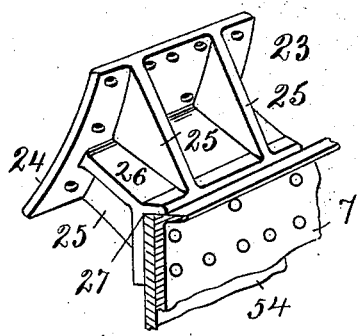
Figure 8:
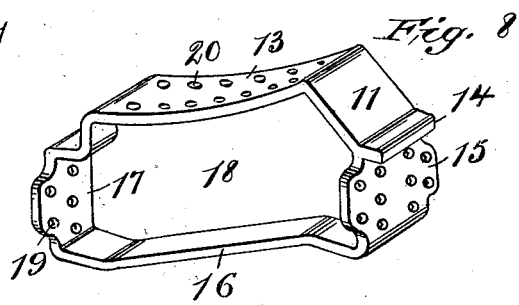
Figure 9:
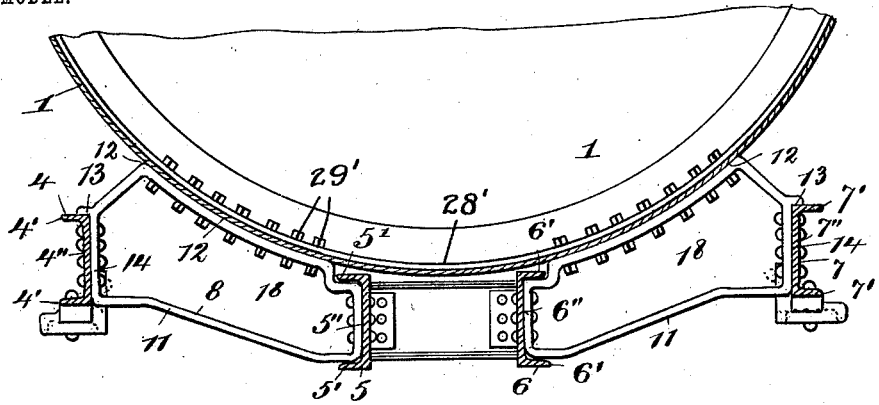
Figure 10:
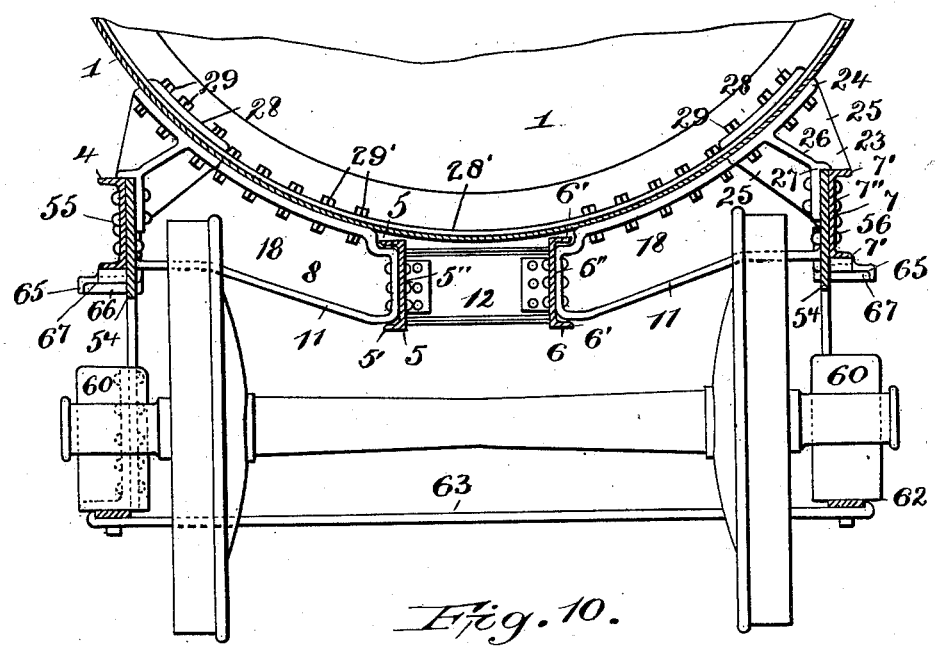

In the drawings forming part of this specification, Figure 1 is a side elevation of a complete locomotive-tender embodying my improvements. Figs. 2 and 3 are respectively elevations of portions of the front and rear of the tender. Figs. 4 and 5 are plan views of the front and rear portions of the body-framing. Fig. 6 is a perspective view of a part of the body-framing. Fig. 7 is a perspective view of a cradle for supporting the body. Fig. 8 is a perspective view of one of the bolster-wings. Fig. 9 is a vertical elevation through the tank and frame on the line 9 9, Fig. 1; and Fig. 10 is a section elevation on the line 10 10, Fig. 1.

At 1 is the water-tank, cylindrical in form and built up in the conventional manner, as shown and described in my above-mentioned patent, and is provided with substantially the same manhole, cover, steps, hand-rails, running-boards, braces, stays, &c., all as therein shown and described. The fuel-box 2 is also substantially the same as that shown by my said patent and will not be further described here. That construction of tank and fuel-box or any other suitable form of tank or body may be employed.

The frame 3 is formed of four parallel longitudinal sills 4, 5, 6, and 7, which are made, preferably, of commercial channel-iron, though any suitable material or shape may be employed, and these sills are provided with the flanges 4', 5', 6', and 7' and webs 4" 5" 6" 7" usually found on channel-irons, and the said flanges are turned outwardly. The sills 5 and 6 are in a plane below that of the sills 4 and 7. These sills are connected by body-bolsters 8, buffer-beams 9 and 10, and cross-pieces 30. The body-bolsters are two in number, though a greater number may be employed, and consist of metal castings or forgings 11 and 12. One of the castings, 11, is fully illustrated in Fig. 8 and consists of a web 18$^a$, a curved portion 13, adapted to fit the cylindrical surface of the tank and to which it is bolted or otherwise rigidly secured. Below the surface and to one side is a shoulder 14, which is adapted to rest on an outside sill of the frame. Beneath the shoulder is a surface 15, which conforms to the inside of an outside sill and to which it is riveted.

16 is a flange which unites the surface 15 with the part 17, which is so shaped that it fits one of the intermediate sills. The rivet-holes are designated by 19 and the bolt-holes by 20. The portion 12 of the bolster is made from an I-beam, (see Fig. 6,) secured to the sills 5 and 6 by means of angle-irons 21 and rivets 22. Bolts 29' pass through the part 13, the tank 1, and then through holes in the flanges 28' of a stay-plate, thus securing the tank rigidly to the frame without danger of breaking or injuring the said tank.

In addition to the bolsters the tank is also supported by means of cradles 23, which consist of curved surfaces 24, attached to transverse webs 25 and a longitudinal web 26. These webs unite the surface 24 with an angle 27, which enables the cradle to be attached to the frame and a pedestal-plate in a manner described below. Suffice it to say that the cradle 23 is so secured that the surface 24 is in alinement with the surface of the tank and that the tank is provided with liners 28, through which the bolts 29 pass that secure the tank to the cradle 23. The buffer-bars 9 and 10 are secured to the sills in substantially the same manner, and hence a description of one is sufficient for both.

At each end of the sills are attached cross-bars 30, which are secured to the sills by means of angles 31 and rivets 32, and to further straighten the frame braces 33 extend diagonally between the outer sills 4 and 7 and cross-bars 30, as shown in Figs. 4 and 5. These braces are riveted to the sills at 34 and at their other ends are secured to the cross-bars 30 by means of bolts 35, which pass through the buffer-bars 9 and 10. The cross-bars 30 are provided with recesses 30' for the coupling.

To further brace and strengthen the frame, braces 12' are fastened and secured between the sills 5 and 6 in precisely the same way as the bolster portion 12. A sheet-metal brace 36 is riveted at 37 to the lower edge of the sills 4 and 7 and to the upper edges of the sills 5 and 6 at 38 adjacent the cross-bar 30 and buffer-bar 10. This sheet metal 36 is bent, because the tops of the sills 5 and 6 and the bottom of the sills 4 and 7 are not in the same plane.

The rear end of the frame is provided with the usual steps 39, step-plate 40, and ladder 42, all as shown and described in my said patent. To better secure the step-plate 40, I provide the bracket 41, which is secured to the buffer 10.

To the front buffer-bar 9 are secured steps 43 by means of bolts 44, provided with wooden treads 45, back 43², sides 41', steps 43³, and these steps are made with integral strengthening-webs 46 and are preferably made out of cast metal.

While I have shown and described my improved step, it is obvious that any well-known form may be used in lieu thereof.

The coupling 47, the buffer 48, the box 49, and the plate 50 are all substantially as shown and described in my above-mentioned patent.

51 is the ordinary windlass for the brake, and 52 is a rod provided with a handle 53 for controlling the tank-valve, which may be of any well-known type.

Between the cradles 23 and the sills 4 and 7 are placed sheet-metal pedestal-plates 54, which are riveted to the webs of the outer sills, as shown at 55 and 56. The pedestal-plates 54 are stamped or otherwise formed out of sheet metal and are provided with longitudinal slots 57, lined and reinforced by castings 58, riveted to the plates at 59 and presenting surfaces 60 on flanges 61, against which the journal-boxes may rub without touching the plates 54. To make the pedestal-plates 54 more rigid, I provide pedestal tie-bars 62 and pedestal stay-rods 63. The rods 62 are provided with lugs 64 64, against which are the ends of the castings 58.

Attached to the lower edges of the sills 4 and 7 are caps 65 with shoulders 66 and plane surfaces 67, against which rest the ends of semi-elliptic springs 68, the middle portion of said springs resting on journal-boxes 69, sliding in grooves 57 against the surfaces 60. The caps 65 are so placed on the sills 4 and 7 that the semi-elliptic springs pass in front of the pedestal-plates, as indicated in Fig. 10. By the arrangement of pedestals, springs, and cradles the weight of the tender is properly distributed over the axles.

The rear coupler 70 may be of any well-known type, although I prefer and have shown twin-spring gear with the Master Car-Builders' standard coupler, which has its draw-bar 71 with a slidably-attached cross-piece 72, which rests against twin springs 73 under a bar 74, which unites the sills 5 and 6. A bar 75, with a perforation through which the draw-bar passes, also unites the sills 5 and 6 and forms a surface against which the ends of the springs 73 rest. To hold these springs in exact alinement, I provide projections or centers 72' and 75' on the parts 72 and 75, respectively, to hold and support the springs 73. The draw-bar 71 moves the cross-pieces 72 and 75 by means of shoulders $72^2$ and $75^2$.

Riveted to the lower edges of the sills 5 and 6 are plates 76, which form slides on which the cross-pieces 72 and 75 rest. On the rear of the piece 72 are stops 77, and immediately in front of the bar 75 are angular stops 78, which are riveted to the sills 5 and 6. The stops 77 and 78 are riveted or bolted to the side plates 76. To the lower side of the bolster-bar 10 is attached a yoke 79 by means of bolts 80.

Having described my invention, I claim—

1. In a tender or similar vehicle, longitudinal sills and cradles extending upwardly and inwardly therefrom, and adapted to receive and support a tank.

2. In a tender or similar vehicle, a frame formed by the combination of longitudinal outer sills and inner sills with body-bolsters having curved upper surfaces adapted to receive and support a tank.

3. In a tender or similar vehicle, a frame formed by the combination of longitudinal outer sills and inner sills sunk below the plane of the outer sills, with body-bolsters adapted to receive and support a tank.

4. In a tender or similar vehicle, a frame formed by the combination of longitudinal sills, with body-bolsters and upwardly and inwardly extending cradles, the said body-bolsters and cradles being arranged to secure and support a tank.

5. In a tender or similar vehicle, longitudinal sills provided with caps adapted to receive the ends of springs.

6. In a tender or similar vehicle, a frame formed by the combination of outer intermediate sills with body-bolsters, cross-bars, and a sheet-metal brace riveted to each of said sills.

7. As an article of manufacture, a cradle for tank-cars, provided with a curved upper part connected to an angle-iron at its lower part by means of longitudinal and transverse webs.

8. In a tender or similar vehicle, outer longitudinal sills, cradles attached thereto and extending upwardly and inwardly, and a tank rigidly secured to said cradles.

9. In a tender or similar vehicle, outer longitudinal sills, cradles attached thereto, a tank resting on said cradles, a liner in said tank and bolts passing through said cradle, tank and liner to hold them rigidly together.

10. In a tender or similar vehicle, a frame formed by longitudinal sills rigidly united by body-bolsters, cradles resting on said sills, and a tank resting on and bolted to the said cradles and bolsters.

11. In a tender or similar vehicle, longitudinal sills and bolsters forming a frame, a tank resting on said bolsters, a flange in the tank, and fastening means passing through the flange, tank and bolsters holding the same rigidly together.

12. In a tender or similar vehicle, a frame provided with outer sills, having pedestals and cradles riveted thereto so that the weight of the tank is put upon the frame immediately above the axles.

13. In a tender or similar vehicle, pedestals provided with stay-rods and tie-bars, and lugs on said bars against which the pedestals rest.

14. In a tender or similar vehicle, sills of angle-iron, sheet-metal pedestals rigidly secured to said sills, and castings or reinforces secured to said pedestals.

15. In a tender or similar vehicle, channel-iron sills, sheet-metal pedestals rigidly attached to said sills and cradles also attached to said sills and pedestals.

16. In a tender or similar vehicle, channel-iron sills having vertical webs and outwardly-projecting flanges, integral sheet-metal pedestals rigidly attached to said webs, and reinforces on said pedestals adapted to receive the axle-boxes.

17. In a tender or similar vehicle, longitudinal sills provided with pedestals, caps on said sills, axle-boxes sliding in said pedestals and semi-elliptic springs resting on said axle-boxes with ends sliding in said caps.

18. In a tender or similar vehicle, a cylindrical tank, longitudinal side sills supporting said tank, pedestals fixed to said sills, axle-boxes sliding in said pedestals, and springs uniting said axle-boxes and sills.

19. In a tender or similar vehicle, a cylindrical tank, side sills, supporting said tank at certain portions of its length, pedestals intermediately below said supporting portions, axle-boxes sliding in said pedestals, and springs uniting said axle-boxes and side sills.

20. In a tender or similar vehicle, a tank, liners in said tank, a frame with cradles and pedestals in vertical alinement, means for securing the tank, cradles and liners together.

21. In a tender or similar vehicle, a tank, cradles secured to a frame fixed to said tank, pedestals fixed to said frame in vertical alinement with said cradles, axle-boxes guided by said pedestals, and springs interposed between said frame and axle-boxes.

22. In a tender or similar vehicle, a tank, a frame with cradles supporting said tank and pedestals secured to said frame.

Signed at the city, county, and State of New York this 28th day of October, 1902.

CORNELIUS VANDERBILT.

Witnesses:
EDWIN C. FARLOW,
LOUIS A. SHEPARD.